United States Patent
Denis et al.

(10) Patent No.: US 8,225,816 B2
(45) Date of Patent: Jul. 24, 2012

(54) PRESSURIZED GAS FILLING AND DISTRIBUTION HEAD AND TANK EQUIPPED WITH ONE SUCH HEAD

(75) Inventors: Arnaud Denis, Lainville en Vexin (FR);
Renaud Ligonesche, Herblay (FR);
Philippe Pisot, L'Isle Adam (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 995 days.

(21) Appl. No.: 12/091,657

(22) PCT Filed: Oct. 18, 2006

(86) PCT No.: PCT/FR2006/051049
§ 371 (c)(1),
(2), (4) Date: Aug. 29, 2008

(87) PCT Pub. No.: WO2007/048954
PCT Pub. Date: May 3, 2007

(65) Prior Publication Data
US 2009/0223976 A1    Sep. 10, 2009

(30) Foreign Application Priority Data
Oct. 27, 2005    (FR) ...................................... 05 53261

(51) Int. Cl.
*B65D 90/00*    (2006.01)
*G05D 16/00*    (2006.01)
(52) U.S. Cl. .................................... 137/613; 137/505.25
(58) Field of Classification Search .................. 137/613, 137/505.25, 505.42, 382, 377
See application file for complete search history.

(56) References Cited

U.S. PATENT DOCUMENTS 2,756,105 A    7/1956    Magill
(Continued)

FOREIGN PATENT DOCUMENTS

DE    43 34 182    4/1995
(Continued)

OTHER PUBLICATIONS

International Search Report for PCT/FR2006/051049.
(Continued)

*Primary Examiner* — Kevin Lee
(74) *Attorney, Agent, or Firm* — Allen E. White

(57) ABSTRACT

The invention relates to a gas filling and distribution head (2) which is intended to be disposed in a hole in a pressurized gas storage tank. The inventive head (2) includes a mounting segment (21) which is intended to be housed in the hole in the tank and an expansion segment which houses a pre-expansion device (22), said pre-expansion device (22) being arranged in relation to the mounting segment (21) such as to be housed at least partially inside the tank when the head is in the mounted position. The head (2) also includes: a filling circuit which extends between a first end which is equipped with a filling hole (6) and a second end which is intended to communicate with the interior of the tank, and an extraction circuit which extends between a first end which is intended to communicate with the interior of the tank and a second end which is equipped with an extraction hole. The invention is characterized in that the filling hole (6) is aligned with the extraction hole.

18 Claims, 14 Drawing Sheets

U.S. PATENT DOCUMENTS

| | | | |
|---|---|---|---|
| 3,035,605 A | | 5/1962 | Ninnelt |
| 3,788,511 A | | 1/1974 | Marsh |
| 3,921,872 A | | 11/1975 | Buell, Jr. |
| 4,832,398 A | | 5/1989 | Tecca et al. |
| 4,905,855 A | | 3/1990 | Troiano et al. |
| 4,964,529 A | | 10/1990 | Houston |
| 5,018,552 A | | 5/1991 | Politi et al. |
| 5,127,436 A | * | 7/1992 | Campion et al. ......... 137/614.11 |
| 5,465,754 A | | 11/1995 | Sudo et al. |
| 5,562,117 A | | 10/1996 | Borland et al. |
| 5,829,629 A | | 11/1998 | Usher |
| 5,975,121 A | | 11/1999 | Arzenton et al. |
| 6,539,970 B1 | | 4/2003 | Knowles et al. |
| 6,557,821 B2 | * | 5/2003 | Girouard et al. ........... 251/30.01 |
| 6,620,256 B1 | | 9/2003 | Arno et al. |
| 6,691,729 B2 | | 2/2004 | Takeda et al. |
| 6,786,131 B2 | | 9/2004 | Tsai |
| 6,929,028 B2 | * | 8/2005 | Larsen et al. ................. 137/613 |
| 2002/0036278 A1 | | 3/2002 | Girouard et al. |
| 2004/0144803 A1 | | 7/2004 | Baker |
| 2006/0065672 A1 | | 3/2006 | Lecourt et al. |
| 2008/0308181 A1 | | 12/2008 | Denis et al. |
| 2009/0166359 A1 | | 7/2009 | Pisot |
| 2009/0223580 A1 | | 9/2009 | Denis et al. |
| 2010/0059142 A1 | | 3/2010 | Denis |

FOREIGN PATENT DOCUMENTS

| | | |
|---|---|---|
| EP | 0 467 769 | 1/1992 |
| EP | 0 668 468 | 1/1995 |
| EP | 1 143 191 | 4/2000 |
| EP | 1 026 438 | 8/2000 |
| EP | 1316755 | 6/2003 |
| EP | 1 367 316 | 12/2003 |
| EP | 1 943 456 | 7/2008 |
| FR | 2 716 951 | 9/1995 |
| FR | 2 774 452 | 8/1999 |
| FR | 2 793 297 | 11/2000 |
| FR | 2 803 366 | 7/2001 |
| FR | 2 892 797 | 5/2007 |
| FR | 2 892 798 | 5/2007 |
| FR | 2 892 799 | 5/2007 |
| WO | WO 2007 048952 | 5/2007 |
| WO | WO 2007 048953 | 5/2007 |
| WO | WO 2007 048954 | 5/2007 |
| WO | WO 2007 048955 | 5/2007 |
| WO | WO 2007 048956 | 5/2007 |
| WO | WO 2007 048957 | 5/2007 |

OTHER PUBLICATIONS

French Search Report and Written Opinion for corresponding FR 0553261, Jul. 20, 2006.
French Search Report for related FR 0552598, Oct. 7, 1998.
French Search Report for related FR 0571098, Feb. 4, 2000.
French Search Report for related FR 0581212, Oct. 18, 2000.
Written Opinion for corresponding PCT/FR2006/051049, Feb. 13, 2007.
French Search Report for related FR 0553263, Jun. 29, 2006.
International Search Report and Written Opinion for related PCT/FR2006/051048, Feb. 5, 2007.
Pending claim set for related U.S. Appl. No. 12/091,669, Apr. 25, 2008.
US Office Action for related U.S. Appl. No. 12/091,669, Jul. 14, 2011.
French Search Report for related FR 0553265, Jun. 29, 2006.
International Search Report and Written Opinion for related PCT/FR2006/051047, Feb. 5, 2007.
US Office Action for related U.S. Appl. No. 12/091,678, Aug. 3, 2010.
Response to Office Action for related U.S. Appl. No. 12/091,678, Feb. 2, 2011.
US Office Action for related U.S. Appl. No. 12/091,678, Apr. 14, 2011.
Response to Office Action for related U.S. Appl. No. 12/091,678, Jul. 14, 2011.
Pending claim set for related U.S. Appl. No. 12/091,678, Jul. 14, 2011.
Notice of Allowance for related U.S. Appl. No. 12/091,678, Aug. 5, 2011.
International Search Report and Written Opinion for related PCT/FR2006/051053, Feb. 20, 2007.
Pending claim set for related U.S. Appl. No. 12/091,683, Apr. 25, 2008.
US Office Action for related U.S. Appl. No. 12/091,683, Jun. 21, 2011.
International Search Report and Written Opinion for related PCT/FR2006/051050, Feb. 13, 2007.
Pending claim set for related U.S. Appl. No. 12/091,690, Apr. 25, 2008.
US Office Action for related U.S. Appl. No. 12/091,690, Jun. 23, 2011.

* cited by examiner

PRESSURIZED GAS FILLING AND DISTRIBUTION HEAD AND TANK EQUIPPED WITH ONE SUCH HEAD

This application is a §371 of International PCT Application PCT/FR2006/051049, filed Oct. 18, 2006.

BACKGROUND

1. Field of the Invention

The present invention relates to a pressurized-gas filling and distribution head and to a tank equipped with such a head.

2. Related Art

The supply of gas to gas-consuming devices, for example fuel cells, presents numerous problems. In particular, it is important to simplify and secure the supply by, in particular, working along the principle of exchanging an empty tank for a full tank.

This problem is all the more sensitive because the current trend is to increase service pressures with a view to offering a better ratio between the mass of stored gas and the overall mass of the tank, combined with smallness of size.

In addition, such systems are becoming more widespread, involving use of the gas by non-specialists (professionals such as nurses, laboratory workers, for example, or by the general public such as DIY enthusiasts, motorists, etc.).

One objective of the systems for storing fluid and of the devices for filling them and/or for tapping fluid off from them, is to make the handling operations needed to exchange an empty tank for a full tank easier. The storage systems have in addition implicitly to provide a level of safety that allows the handling operations to be performed by non-specialists while at the same time improving the safety and productivity in tank processing centers.

It is known practice for gas to be stored in liquid form. In known solutions ($CO_2$ for example), this is performed quite naturally and does not require the use of special facilities. In most cases (for example that of hydrogen), however, it is necessary to maintain temperature conditions such that the use of special facilities is compulsory (thermal insulation, control of boiling or "boil-off"). This operation makes the solution for storing liquid somewhat irrelevant because it is far too complicated and ill suited to the idea of exchanging an empty one for a full one.

Solutions for storing gas in gaseous form conventionally include cylinders equipped with a simple valve which, if open, places the user in direct contact with the storage pressure. It is therefore necessary, in order to use the gas, to connect up equipment (pressure regulators, flow meters, etc.) and this entails tooling and tricky operations. These operations become all the more risky when the user is not a professional (with the risk of leaks, forcible expulsion of parts, etc.).

Lightweight small-sized gas refills are known, these proposing a solution which is to provide the canister with a valve that has no actuating member, but the disadvantage with these is that the gas is delivered at the storage pressure.

In order to guard against the risks associated with the high pressure, canisters or cylinders may be equipped with a regulating valve which, as far as the user is concerned, allows him access only to a reduced pressure. This solution has the disadvantage of creating a protruding part on the cylinder. This protruding part therefore needs to be protected. This protection is generally formed by a bonnet. On the whole, the weight and size are increased and incorporating the cylinder into the application that requires the gas may lack simplicity.

Furthermore, most reserves of gas delivered to customers need to be mobile. In an extreme case, the self-contained gas source may have to be deployed and to accompany the gas-consuming application, for example to supply a fuel cell at an isolated site or to accompany fire fighters attending an emergency.

Each customer or customer family has its own specific requirements that have to be met as best possible. The consequence of this is to make the industrial organization more complicated because it is necessary to manage a wide variety of products (fluid/tank pairing and fluid delivery conditions).

One problem that needs to be solved is, on the one hand, to offer the user and/or the operator means that make it easier for him to transport and to handle a reserve of gas and, on the other hand, to offer the user means that will allow him to customize the design of a reserve of gas in order to meet the requirements of his particular application and to allow the operator flexibility that will allow him to manage the variety of products needed to meet the requirements of his customers.

Of the solutions for storing gas in gaseous form, cylinders equipped with a simple valve are favored by the operators and by industry for questions of managing the population of cylinders. If open, the simple valve places the user directly in contact with the fluid at its storage pressure. It is therefore necessary, in order to use the gas, to connect up hardware (pressure regulator, flow meter, etc.) which demands tooling and tricky operations, accompanied by the risks involved in this type of operation when the user is not a professional. This solution is therefore not favored by the end-user.

Better favored by the end-user is the regulating valve attached to the cylinder delivering the fluid as the pressure needed by the application. However, use of such a regulating valve places significant constraints upon industry particularly in terms of managing the population of cylinders, maintenance, interface with the filling equipment, etc.

In known designs for storing gas under pressure, the valve incorporates a regulating device which is positioned inside the volume of the cylinder (cf. for example EP-A-1316755). These known devices make it possible in part to limit the volume of the valve but require the user to perform numerous handling and coupling operations in order to fill and tap off from the cylinder.

Thus, none of the aforementioned existing solutions simultaneously considers these specific requirements of industry and those of the customer.

it is one object of the present invention to alleviate all or some of the disadvantages recalled hereinabove of the prior art.

SUMMARY OF THE INVENTION

To this end, the invention relates to a gas filling distribution head intended to be placed in the orifice of a pressurized-gas storage tank, the head comprising a mounting portion intended to be housed in the orifice of the tank and a pressure-regulating portion housing a pre-regulating device, the pre-regulating device being positioned relative to the mounting portion such that it is housed at least partially inside the tank when the head is in the mounted position, the head comprising a filling circuit extending between a first end provided with a filling orifice and a second end intended to communicate with the inside of the tank, a tapping-off circuit (22, 23, 283, 32, 6) extending between a first end intended to communicate with the inside of the tank and a second end provided with a tapping-off orifice.

BRIEF DESCRIPTION OF THE FIGURES

Other particulars and advantages will become apparent from reading the below description which is given with reference to the figures in which.

DETAILED DESCRIPTION OF THE INVENTION

Figure 1:
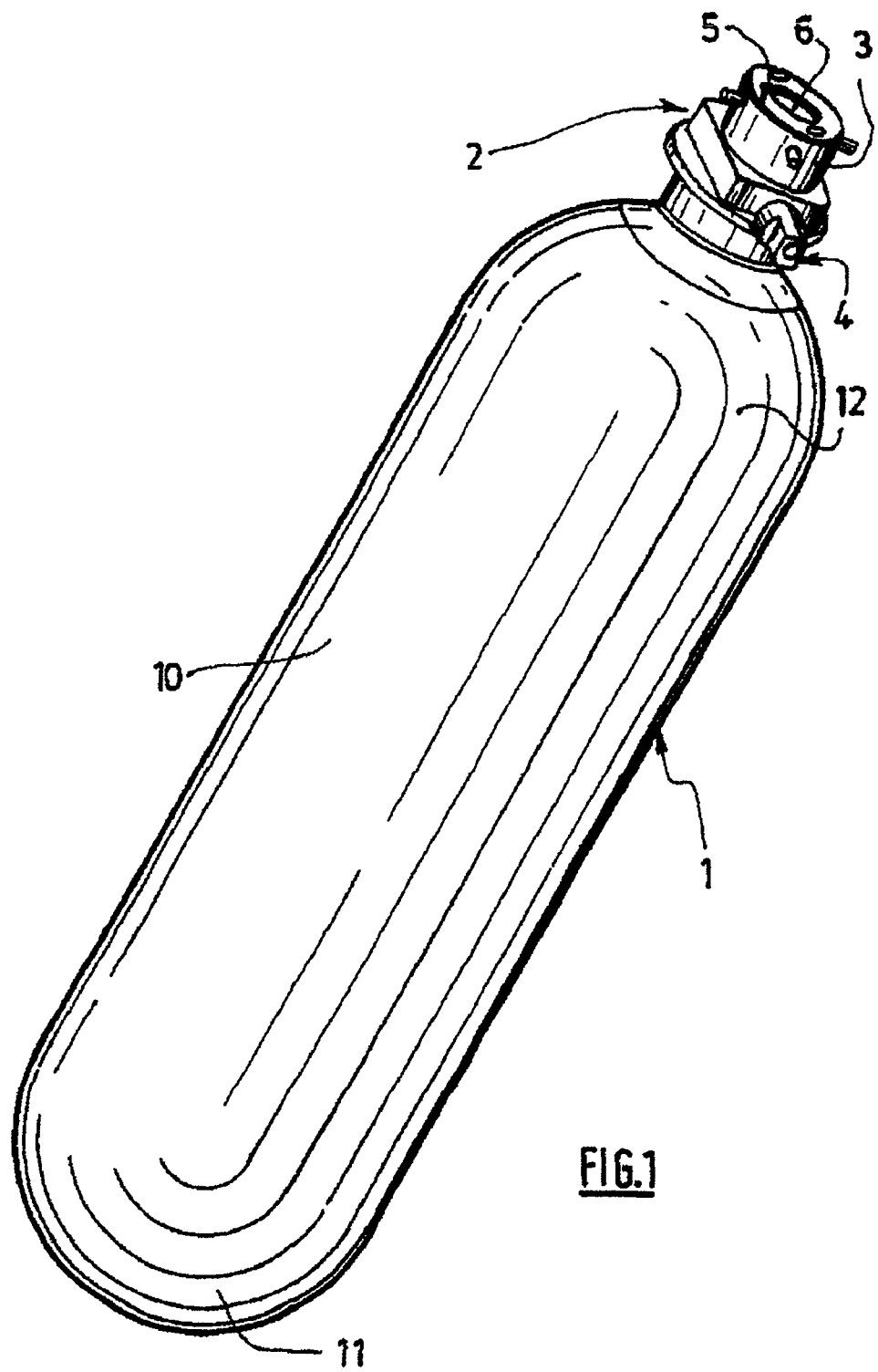
FIGS. 1 and 2 depict external views in isometric projection of one exemplary embodiment of a tank according to the invention, respectively with and without a casing covering the external surface of the tank 1.

According to the invention, the filling orifice coincides with the tapping-off orifice.

Furthermore, the invention may have one or more of the following features:

- the head comprises an isolating member such as an isolating valve,
- the isolating member is positioned relative to the mounting portion so that it is at least partially housed inside the volume of the tank when the head is mounted in position in the orifice of a tank,
- the isolating member is formed in such a way that it can be opened and/or closed by an actuating element external to the head,
- the isolating member is housed at least partially inside the volume of the head and is accessible to an actuating element external to the head via an access orifice formed in the head,
- the access orifice providing access to the isolating member coincides with the orifice intended both for filling and for tapping-off,
- the isolating member is positioned downstream of the pre-regulating device on the tapping-off circuit (22, 23, 283, 32, 6) between the first end and the second end of the tapping-off circuit (22, 23, 283, 32, 6),
- the isolating member is positioned downstream of the pre-regulating device in a path from the inside of the tank to the outside of the tank,
- the isolating member and the pre-regulating device are positioned in one and the same duct along which fluid flows between the inside and the outside of the tank, such that the filling and the emptying of the tank are performed more or less along one and the same axis and via this same duct,
- the tank comprises a connection interface intended to collaborate removably with a device for controlling the filling of the tank and/or the delivery of fluid from the tank,
- the connection interface comprises an internal portion housed inside the body of the filling head and in that the isolating member is positioned at least partially within the portion housed inside the internal portion of the interface,
- the isolating member comprises a body capable of moving relative to the head and able to collaborate for the purposes of being open or for the purposes of being closed with a seat, the isolating member comprising a free downstream end capable of being pushed in order to open or close it,
- the isolating member is capable of translational movement,
- the pre-regulating device comprises a movable shutter member capable of collaborating for the purposes of being open or for the purposes of being closed with a seat, a first return means urging the valve element toward its closed position against the seat, the valve element being urged into its open position by a free-regulating piston urged by a second return means.

Another object of the invention is to propose a tank for pressurized fluid, comprising a casing delimiting a storage volume and provided with an orifice for communicating with the inside of the tank, the tank comprising a filling and distribution head positioned at the orifice, according to any one of the features mentioned hereinabove or hereinafter.

Furthermore, the invention may include one or more of the following features:

- the tank comprises a casing delimiting a storage volume and provided with an orifice for communicating with the inside of the tank, the tank comprising a filling and distribution head positioned at the orifice, characterized in that the head is a head according to any one of the preceding features, and in that the isolating member and the pre-regulating device are positioned in one and the same duct along which fluid flows between the inside and the outside of the tank, the filling and the emptying of the tank being performed more or less via one and the same orifice and along one and the same axis that more or less coincides with the axis of the tank,
- the filling (6, 8, 32, 283, 23, 22) and tapping-off circuits (22, 23, 283, 32, 6) have at least one portion in common,
- the pre-regulating device comprises a two-way valve mechanism selectively allowing the pressure-regulated gas to leave the tank or high-pressure gas to enter the tank depending on the pressure differential across the two-way valve mechanism,
- the pre-regulating device comprises a pre-regulating valve urged toward a seat and subjected to the opposing force of a pre-regulating piston,
- the pre-regulating piston comprises an internal duct connected, on the one hand, to the isolating member and, on the other hand, to a low-pressure chamber situated at the junction between the seat and the said pre-regulating piston, the filling circuit (6, 8, 32, 283, 23, 22) comprises a bypass portion (375) that bypasses the pre-regulating device to prevent filling gas from passing through the pre-regulating device during filling.

According to other possible features, the invention proposes a device for controlling the filling of and/or the tapping-off from the tank comprising a body provided with a connection end provided with attachment means intended to collaborate with complementary attachment means belonging in particular to a connection interface of a tank for pressurized fluid, a valve-opening member that can move relative to the body, actuating means capable selectively of moving the valve opening member between a rest position and a work position, that alleviates all or some of the above disadvantages.

To this end, the device for controlling the filling of and/or the tapping-off from the tank is essentially characterized in that it comprises a body provided with a connection end provided with attachment means which are intended to collaborate with complementary attachment means belonging in particular to a connection interface of a tank for a pressurized fluid, a valve-opening member capable of moving relative to the body, actuating means capable selectively of moving the valve-opening member between a rest position and a work position, characterized in that, in the work position, one end of the opening member projects out of the body beyond the connection end so as to allow the valve-opening member to dip down inside a volume of a complementary connection interface.

Furthermore, the invention may have one or more of the following features:
- the complementary attachment means comprise projecting pins and/or mating housings so as to form a fastening of the bayonet type,
- the device comprises removable means of locking the attachment means,
- the attachment means comprise housings substantially in the shape of cranked slots having an open first end intended to allow a pin to enter and exit the housing and a second end that forms a closed end designed to accommodate the pin in the attached position, the removable means of locking comprising at least one end forming an end stop in at least one housing, the end stop being able to move between an immobilizing first position between the two ends of the housing, and a retracted second position allowing travel between the two ends of the housing,
- the device comprises return means that urge the end stop into its immobilizing position, the end stop being capable of being moved into its retracted position either under the pressure of a pin inserted from the first end of the housing or by pulling on the locking means using a region for grasping,
- the device comprises a fluid inlet orifice, a first safety valve, and a fluid pressure regulating member, the first safety valve and the pressure regulating member being connected in parallel to the inlet orifice via a duct,
- the outlet of the pressure regulating member is connected to a second safety valve and to a fluid outlet orifice leading to the outside of the device,
- the second safety valve and the fluid outlet orifice are connected in parallel to the outlet of the pressure regulating member via respective pipes,
- the isolating member comprises a body able to move relative to the head and capable of collaborating for the purposes of being open or for the purposes of being closed with a seat, the isolating member comprising a free downstream end capable of being pushed in order to open or close it,
- the isolating member is capable of translational movement,
- the pre-regulating device comprises a moving valve element capable of collaborating for the purposes of being open or for the purposes of being closed with a seat, a first return means urging the valve element toward its closed position against the seat, the valve element being urged toward its open position by a pre-regulating piston urged by a second return means,
- the tank comprises a so-called "low pressure" chamber downstream of the pre-regulating device,
- the isolating member and the pre-regulating valve are able to move more or less along the same axis,
- the connection interface comprises an external portion projecting out of the tank and provided with attachment means intended to collaborate with complementary attachment means belonging to a device for controlling the filling and/or the tapping-off,
- the external portion comprises a concave accommodating region intended to accommodate and to guide a tubular end of a control device,
- the filling head comprises a tell-tale device indicating the fill status of the tank and comprising at least one duct in communication with the inside of the tank, a moving indicator member subjected, on the one hand, to the pressure inside the tank via the duct and subjected, on the other hand, to the influence of a return means, the position of the moving indicator member being correlated with the pressure inside the tank,
- the filling head comprises a safety discharge device comprising a port, the port comprising a first end connected to the outside of the tank and blocked off by a closure means that can melt under the action of heat and/or when a determined pressure is exceeded, and a second end connected to the inside of the tank,
- the tank comprises removable and/or deformable protective means forming a removable screen between the outside of the tank and the isolating member,
- the tank comprises an axis of almost symmetry that is longitudinal, and in that the attachment means of the external portion of the interface are directed or positioned along the longitudinal axis of symmetry,
- the low-pressure chamber is connected to the internal portion of the interface via a passage that passes through the pre-regulating piston,
- the additional attachment means are formed respectively on the end walls and on the external portion of the connection interface.

Another object of the invention is to propose an assembly comprising a tank and a device for controlling the filling of the tank and/or the tapping-off of fluid from the tank, according to any one of the preceding or following features.

Other particulars and advantages will become apparent from reading the following description which is given with reference to the figures in which:

FIG. 1 depicts an oblong tank body 1 having a cylindrical main part 10 and two substantially dome-shaped ends, one lower 11 and one upper 12. The rounded upper end 12 has a filling and distributing head 2. As depicted, the filling and distribution head 2 in particular comprises a connection interface 3, a tell-tale indicating the fill level 4, an anti-knock shield and a central orifice 6 providing access to the inside of the tank 1.

Figure 2:
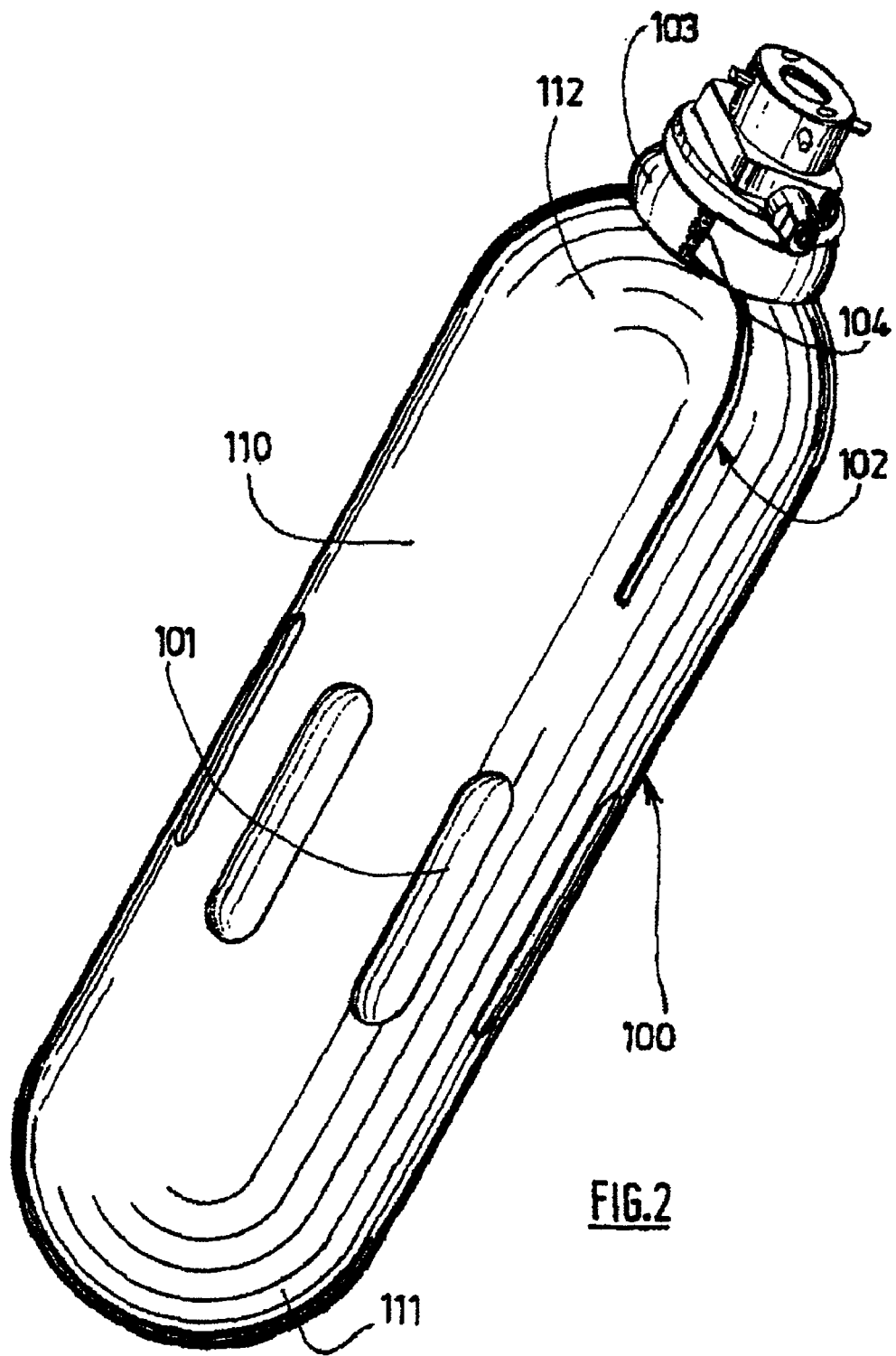

FIG. 2 shows an alternative form of the gas storage assembly (tank 1) according to the same embodiment, with an optional casing 100 more or less entirely covering the external surface of the tank 1. The casing 100 (or jacket) is designed to protect the tank 1 against any knocks or droppage.

The oblong casing 100 of dimensions tailored to the tank 1 has its rounded lower end 111 made to correspond to the lower end 11 of the tank 1. The cylindrical central part of the casing 100 hugs the cylindrical part 10 of the tank 1. The rounded upper end 112 of the casing for its part covers the upper end 12 of the tank 1.

Slots 102 on the periphery of the upper end 112 of the casing allow the casing 100 to be slipped over the tank 1.

At the upper end of the casing in particular, a collar 103 fitted with a closure 104 (of the touch-and-close type or press-stud type or any other equivalent means) may be provided to hold the casing 100 in place on the tank 1.

The casing 100 on its periphery has ergonomic imprints 101 making the whole easy to hold. The casing 100 is preferably made of thermoformed high-density foam but any other material such as neoprene, an elastomeric material, etc. may be considered.

Figure 3:
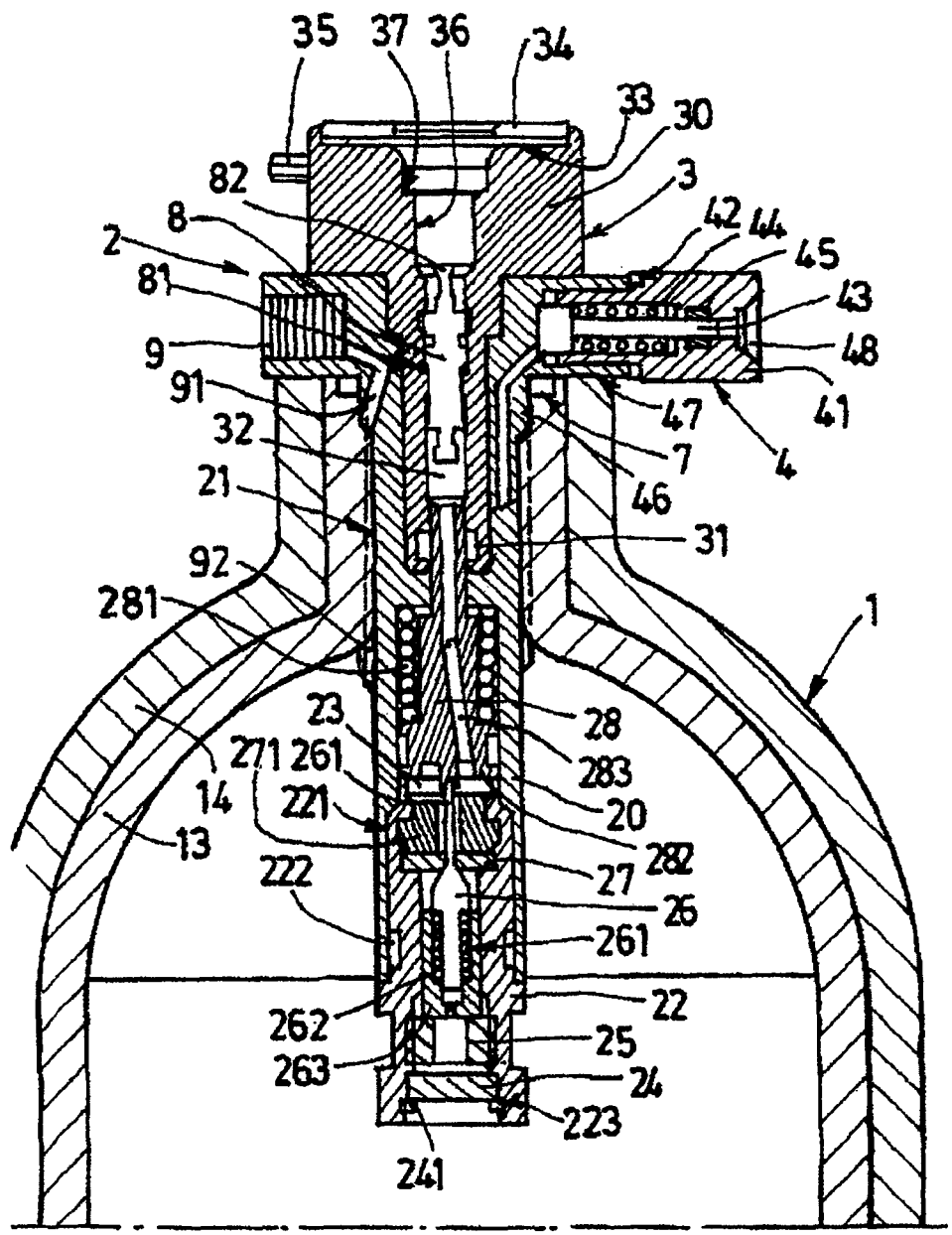
FIG. 3 is a view in longitudinal section on a larger scale of the upper part of the tank of FIG. 2.

Reference is now made to FIG. 3 in which the tank 1 comprises a sealed internal casing 13 (or "liner"), for example made of aluminum alloy or the like, intended to contain the fluid and particularly gas under pressure. The casing 13 is reinforced on its external surface by a winding of carbon fiber filaments 14 bonded together with epoxy resin or any other equivalent means.

An oblong filling head 2 is positioned in the tank 1, at the orifice of the tank 1, inside the casing inner 13.

The body 20 of the filling and distribution head 2 is mechanically connected to the casing 13 by virtue, for example, of a screw thread 21 collaborating with a tapped thread formed on the casing 13. An annular seal 7 is positioned in a groove formed in the casing 13. The groove lies at the upper end of the casing 13 and is enclosed by the body 20 of the filling and distribution head 2 so as to provide sealing between the body 20 and the inside of the tank 1.

The filling and distribution head 2 in its lower part comprises a pre-regulating cartridge 22 which is screwed into its body 20 by virtue of a screw thread/tapped thread system 221.

Downstream of the pre-regulating cartridge 22 (toward the top of the cartridge 22), the filling and distribution head 2 comprises a low-pressure chamber 23. Sealing between the inside of the tank 1 and the low-pressure chamber 23 is afforded by the combination 222 of an O-ring and of anti-extrusion rings positioned between the cartridge 22 and the body 20 of the head 2.

The pre-regulating cartridge 22 comprises, working from upstream to downstream (that is to say from its lower part toward its upper part in FIG. 3), a filter 24, a threaded ring 25 and a pre-regulating valve 26. The filter 24 is held in the cartridge 22 by an elastic ring 241 housed in a groove 223 formed in the body of the cartridge 22.

The pre-regulating valve 26 is subjected to the action of a spring 261 moving it toward a seat 27 held in the cartridge 22 under the action of the threaded seat holder 271. The valve 26 is subjected to the force of the valve spring 261 and to the force of the pressurized gas.

The upper end of the valve 26 is equipped with a stem 261 extending upward and the end of which is in contact with a pre-regulating piston 28. The piston 28 for its part is urged toward the valve 26 by a spring 281. Because of the force of the spring 281 and the action of the gas on the cross section 282 of the piston 28, the valve 26 acts as a pressure regulator.

During phases in which gas is tapped off from the tank 1, the gas contained in the tank 1 under high pressure passes, while its pressure is being reduced, through the pre-regulating cartridge 22 toward the low-pressure chamber 23.

The pressure-regulated gas then passes through the piston 28 via a drilling 283 formed in the body of the piston, to emerge in a chamber 32 situated in the body of a connection interface 3. The connection interface 3 is mounted at the upper end of the head 2.

The chamber 32 comprises an isolating valve 8 which is sealed with respect to the inside of the tank by a seal that seals against the body 30 of the connection interface 3.

The default setting of the isolating valve 8 is closed. The isolating valve 8 is, for example, a valve of a conventional type, such as a valve comprising a fixed tubular body and a rod capable of moving inside the body to make the valve allow the passage of fluid or prevent the passage of fluid depending on the position of the rod.

The valve 8 can be actuated by a valve driver external to the head, that is to say belonging to an external actuating means that can be attached to the head 2. The valve driver system described in greater detail hereinafter may belong to a system that receives the storage assembly or to a gas distribution head or to a cylinder filling connector.

The upper end of the connection interface 3 projects out from the filling and distribution head 2 of the tank 1.

This outer part of the connection interface 3 comprises four projecting pins 35 (bayonets) positioned 90° apart to allow for attachment of a receiving system belonging to a storage assembly or to a gas distribution head or to a filling connector. Of course, this exemplary embodiment is nonlimiting, particularly given the considerable number of conceivable combinations of number, shape and position of pins and corresponding polarizing (that is to say geometrical identity) options available. In addition, other attachment means that perform the same function are conceivable, including screw/nut connections, a latch lock lever, a retractable catch, etc.

The outer part of the connection interface 3 comprises a tubular housing forming an accommodating region 36 the purpose of which is to accept and to guide a mating tubular end of a receiving system or of a gas distribution head or of a filling connector as described hereinafter.

To this end, the mating tubular end of the control member intended to be connected to the tank 1 comprises an O-ring seal and possibly an anti-extrusion ring to ensure the continuity of the seal between the control device and the tank 1.

The external part of the connection interface 3 preferably comprises a removable protective membrane 33 intended to avoid the ingress of particles or dirt into the accommodating region 36 and that might cause the system to malfunction. The membrane 33 is, for example, made of precut shape-memory polymer. The membrane is, for example, held at the inlet of the accommodating region 36 by a plastic anti-impact shield 34. Of course, any other form of embodiment for protecting the inlet of the accommodating region is conceivable, for example a film that has to be punctured, or a sticker that has to be removed, or the like.

Thus, when the tubular end of a control device (receiving system or gas distribution head or a filling connector) is introduced into the receiving region 36, the precut membrane 33 will move aside against the surface 37 of the connection interface 3. For example, the shape-memory protective membrane 33 is precut into four "petal-shaped" lobes. As it enters, the male tubular end of a control device will push the four lobes back against the surface 37 of the connection interface 3. The lobes will automatically return to their initial position (FIG. 3) when this same tubular end is extracted.

The tank 1 comprises a tell-tale 4 comprising a body 41 screwed into the body 20 of the device of the filling and distribution head 2 by means of a screw thread system 47. Sealing between the tell-tale and the filling head 2 is provided by means of a stressed metal seal 42. A moving spindle 43 is guided in the body 41 of the tell-tale 4. Sealing between the spindle 43 and the body 41 is afforded by the combination 45 of an O-ring seal and of an anti-extrusion ring.

The spindle 43 of the tell-tale 4 is subjected to the opposing forces of a return spring 44 and of the pressure of the gas contained in the tank 1 carried through the tell-tale 4 via a screw thread 21 and drillings 46.

When the action of the gas pressure exceeds the force of the return spring 44, the end of the spindle 43 emerges into a viewing chamber 48 formed in the body 41 of the tell-tale 4. Thus, the tell-tale indicates that the gas store is full (the pressure of the gas contained in the tank 1 is optimal). If not, the end of the spindle 43 does not emerge into a viewing chamber 48, this indicates that the gas store is not full (the pressure of the gas contained in the tank 1 is below the optimum pressure).

A safety device (of the type that melts under the action of heat and/or discharge valve, rupture disk, etc. type) may be fitted to the tank 1 via a port 9 formed in the body 20 of the filling and distribution head 2. This safety device may be fed with the gas contained in the tank 1 via a cut 92 machined in the screw thread 21 and via drillings 91.

Figure 4:
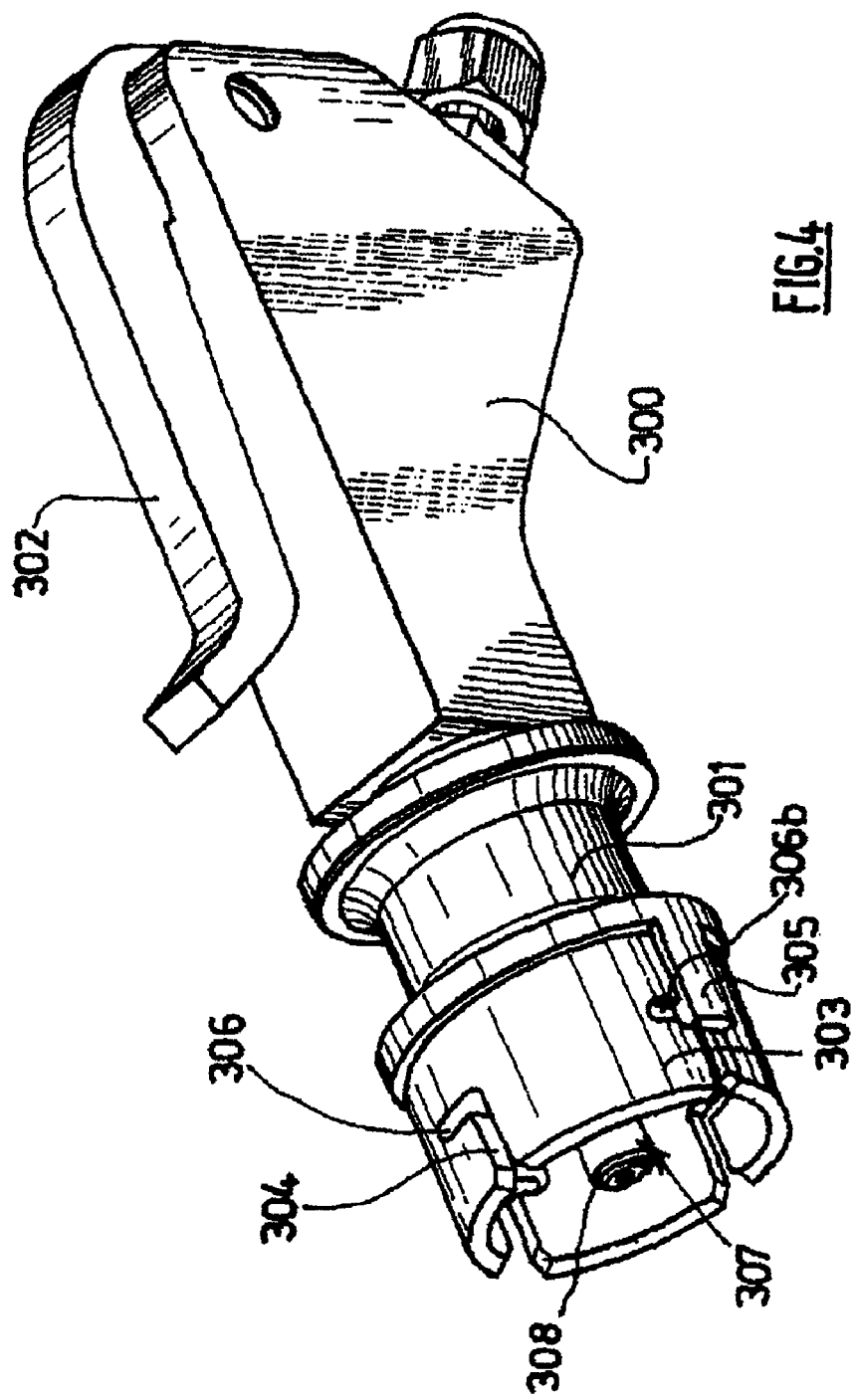
FIG. 4 is an external view in isometric projection of one exemplary embodiment of a filling connector, particularly for a tank according to FIGS. 1 and 2.
Figure 5:
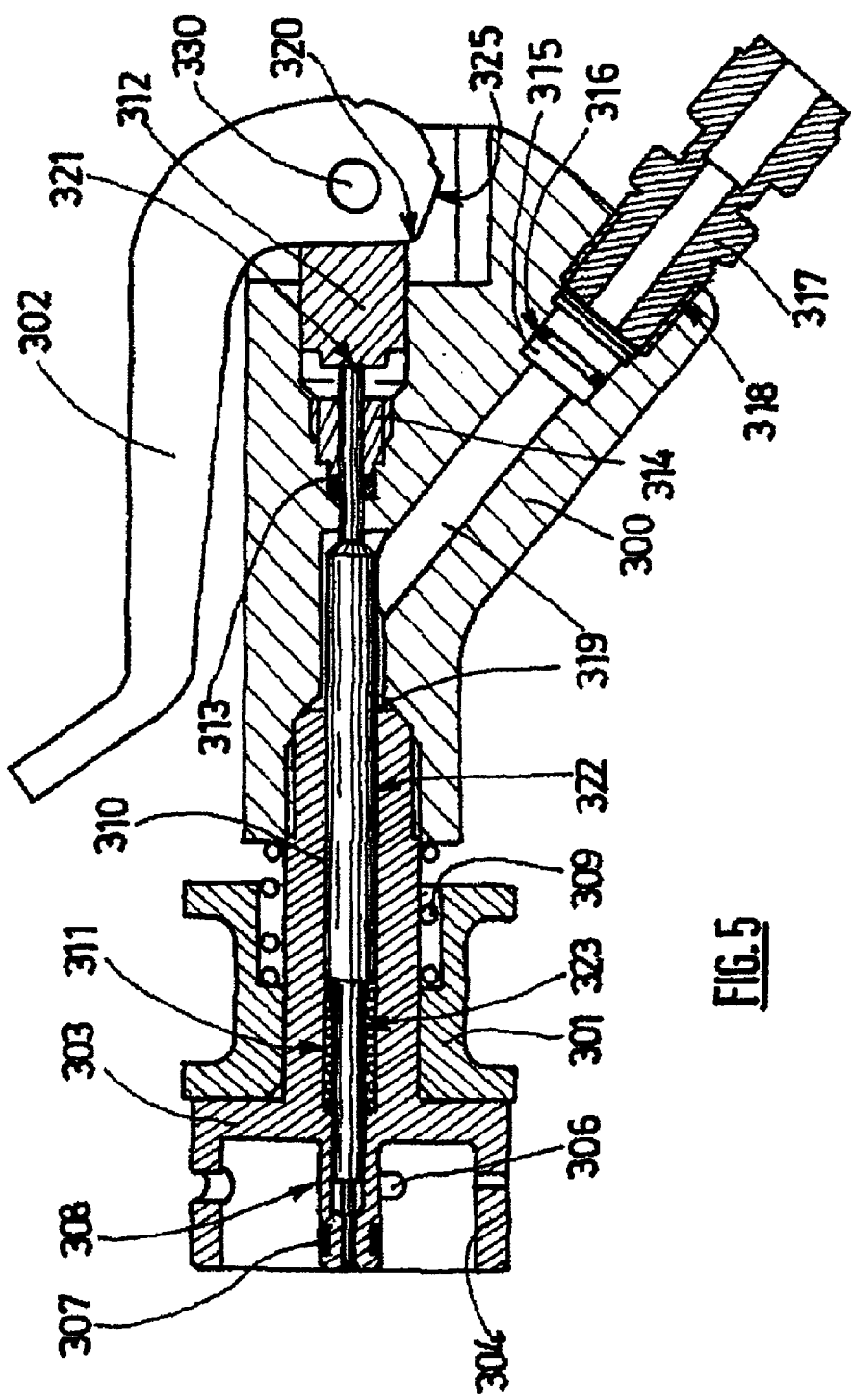
FIG. 5 is a view in longitudinal section of the filling connector of FIG. 4.

FIGS. 4 and 5 illustrate a filling connector that has a body 300, a connection interface 303 and a control lever 302. The body 300 is connected to the end of a filling hose 317 by a screw thread 318 (for example a tapered screw thread sealed with PTFE (polytetrafluoro-ethylene) tape).

The filling hose 317 supplies the filling circuit (317, 319, 8, 32, 283, 23, 22) via a filling pipe 319. The filling pipe 319 is dirt free thanks to a filter 315 held in place in the body 300 under the effect of an elastic ring 316 held captive in a groove formed in this same body.

A manual control lever 302 that can rotate about a spindle 330 is capable of transmitting a translational movement to a valve driver 310 via a cam 320 which rubs against a wear plate 312. Of course, the pivoting manual lever 302 may be replaced by any analogous system, for example an automatic control.

There is a spring 311 in the body 300 in order constantly to keep the end 321 of the valve driver 310 held against the wear plate 312 in contact with the cam 320.

To ensure the continuity of the cross section for the passage of gas through the filling pipe 319, the exterior surface 322 of the valve driver 310 is of hexagonal cross section while the cylindrical surface 323 has two flats. The dynamic sealing of the valve driver 310 with respect to the body 300 is provided by a combination 313 of an O-ring seal and of an anti-extrusion ring, these being held in their housing by a gland 314.

Figure 6:
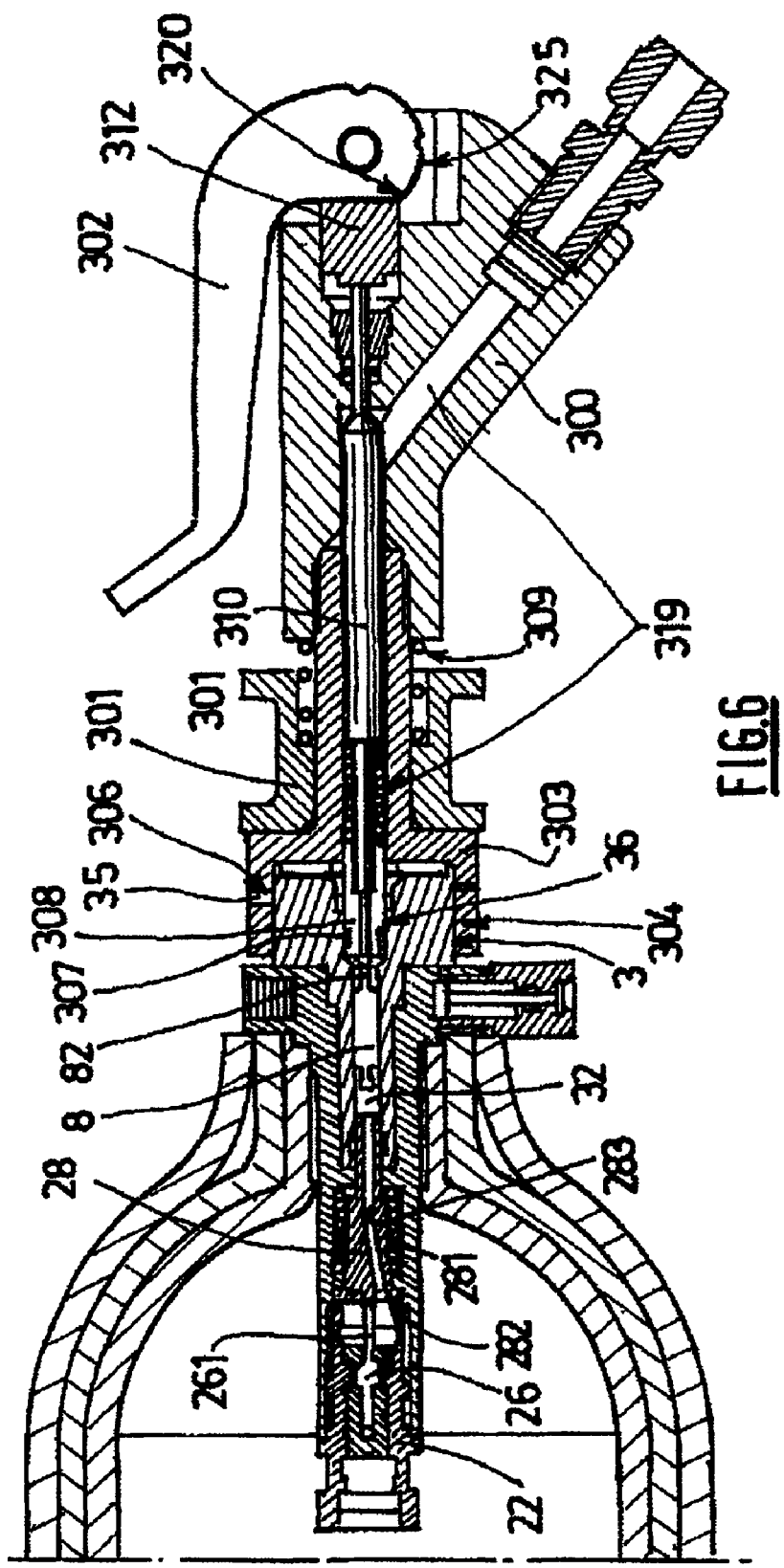
FIG. 6 is a view in longitudinal section of the filling connector of FIG. 4 connected to the tank of FIG. 2.

As depicted more specifically in FIG. 6, the connection interface 303 of the filling connector collaborates with the connection interface 3 of the tank 1.

More specifically, the projecting pins 35 (bayonets) of the connection interface 3 of the tank 1 enter channels or millings 304 in the connection interface 303 of the filling connector. The pins 35 position themselves in the respective housings 306 at the closed ends of the cranked channels 304.

As they enter the channels 304, the pins push and temporarily retract a safety catch 305. When the pins are in their housing 306, the catch 305 is returned to its initial locking position under the action of a spring 309. In this way, the catch 305 traps two diametrically opposed pins 35 in their respective housings 306*b*. In this position, the filling connector is locked onto the tank 1.

The filling connector has a tubular end 308 which becomes housed in the accommodating region 36 of the connection interface 3 of the tank 1. Sealing between these two surfaces (the tubular end 308 and the accommodation region 36) is provided by the combination 307 of a seal and of an anti-extrusion ring.

To open the valve 8 of the tank 1, the lever 302 is actuated in such a way that the cam 320 via the wear plate 302 acts on the valve driver 310 transmitting to it a translational movement that is passed on to the stem 82 of the valve 8.

The valve driver 310 therefore projects relative to the tubular end 308 and relative to the filling connection so as to allow it to dip down into the head 2 housed in the tank 1 in order to actuate the valve 8.

The cam 320 comprises a flat surface 325 that allows this position to remain stable. The valve closure 8 has to be performed manually by performing the reverse operation on the control lever 302.

The filling fluid can then be injected into the filling connector via the pipe 319.

The filling fluid passes in succession through the open valve 8, the chamber 32 and the drilling 283 of the pre-regulating piston 28. The surface 282 of the piston 28 is therefore subjected to the pressure of the gas which is stronger than the force of the spring 281. This gas pressure moves the piston which thus moves free of the end of the stem 261 of the pre-regulating valve 26.

The pre-regulating valve 26 is therefore opened by the action of the pressure of the gas passing through the pre-regulating cartridge 22 in the opposite direction in order to return to the tank 1. As an alternative, the filling circuit may short circuit the pre-regulating system.

At the end of the filling operation, once the high pressure in the filling pipe has been dumped, the pre-regulator can be reactivated. The valve 8 is closed again by action on the control lever 302 of the filling connector.

Once all of the gas contained in the entire filling circuit (6, 8, 32, 283, 23, 22) (the entire volume downstream of the valve 8) has been dumped, the filling connector can be uncoupled through a process that is the reverse of the one described hereinabove.

To uncouple the filling connector, the control 301 of the catch 305 has to be pulled manually against the force of the spring 309 in order to free the protruding pins 35 (bayonets) from their housings 306 and 306*b* following the path of the cranked milled slots 304. The tubular end 308 comes free of the accommodating region 36, the precut membrane 33 returns to its original position preventing particles or dirt from entering.

Figure 7:
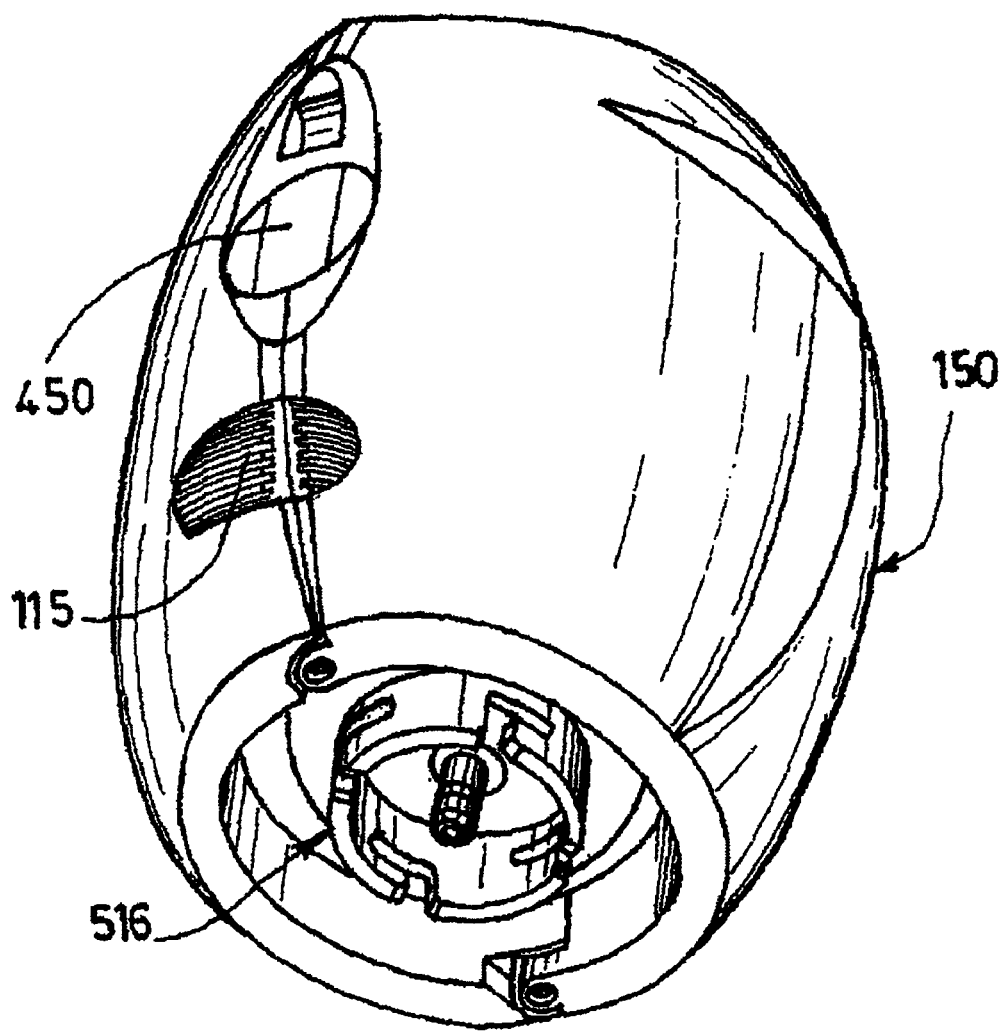
FIGS. 7 and 8 are external views in isometric projection of an exemplary embodiment of a head for delivering fluid according to the invention.
Figure 8:
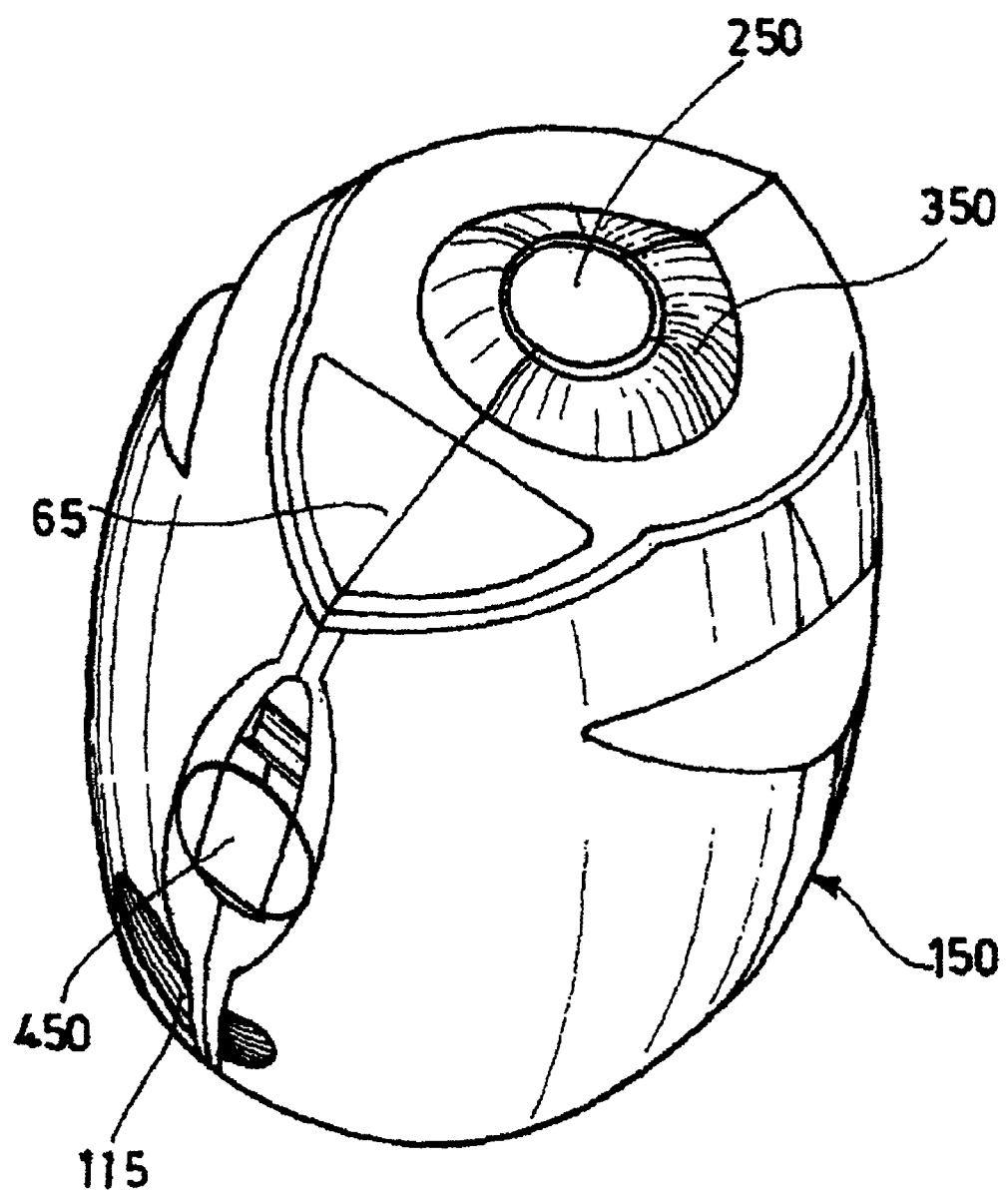

FIGS. 7 and 8 illustrate a removable gas delivery head 150 comprising a control to open up the flow rate of gas 250, an annular knob to shut off the flow rate of gas 350, access 450 to the outlet coupling naturally closed off by a shutter to prevent contamination and a connecting interface 516. The gas delivery head 150 also comprises medium-pressure and low-pressure discharge valve discharge louvers 115 and a location 65 for information intended for the user and which may be in the form of a digital display offering customized autonomy information (or pressure gage or any other known means).

Figure 9:
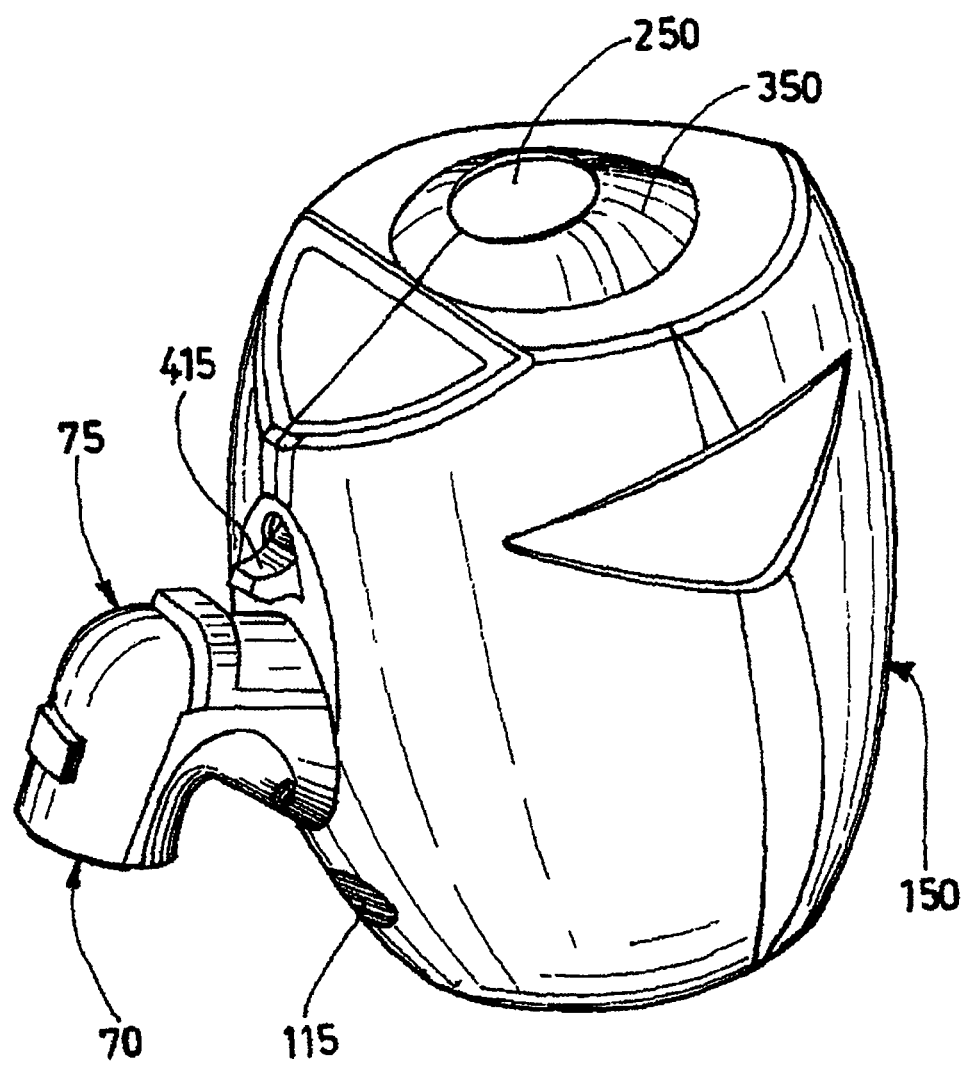
FIG. 9 is an external view in isometric projection of the head delivering fluid of FIGS. 7 and 8, equipped with an outlet coupling.

FIG. 9 illustrates the gas delivery head 150 according to the same embodiment, equipped with an outlet coupling 75 the orifice 70 of which is connected to a hose (not depicted) supplying the application.

Advantageously, the head 150 is shaped in such a way that if the outlet coupling 75 is not connected, it is impossible to lock the control to open the flow rate of gas 250, if the outlet coupling 75 is connected to the removable gas delivery head 150, it is possible to lock the control to open up the flow rate of gas 250, the shutting-off of the flow rate of gas being controlled by action on the annular knob 350 and a control 415 for unlocking the outlet coupling 75 is accessible, if the outlet coupling 75 is suddenly disconnected while the control to open up the gas is active, the latter control is immediately disconnected.

Figure 10:
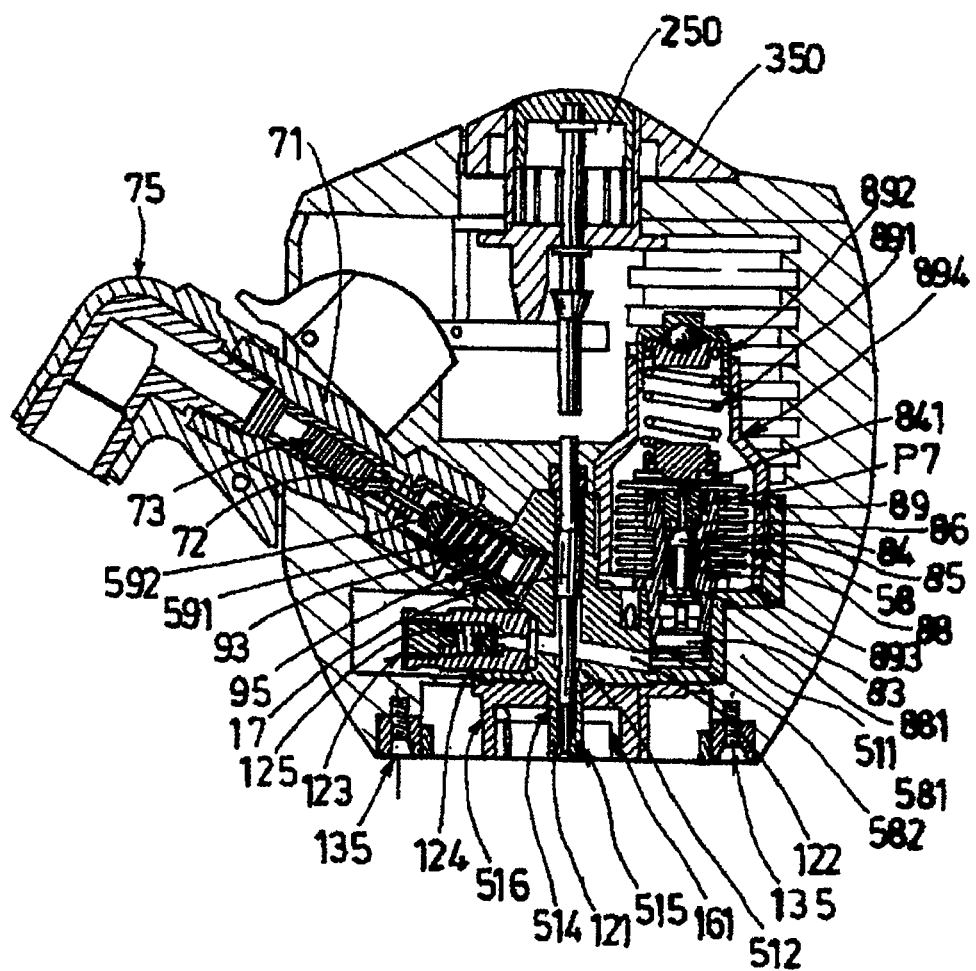
FIG. 10 is a view in longitudinal section of the delivery head of FIGS. 7 and 8, equipped with its outlet coupling.

FIG. 10 depicts details of the gas delivery head according to the same embodiment. The case that protects the delivery head 150 is made up of two half-shells 511 joined together by clips and two screws 135. The delivery head 150 contains, on the one hand, a body 512 comprising the various active gas-delivery components and, on the other hand, the user interface controls. In particular, the delivery head 150 comprises a control to open up the flow rate of gas 250, an annular knob to close off the flow rate of gas 350, and an access 450 providing access to the outlet coupling 75.

The lower part of the body 512 ends in a tubular end 514 with an O-ring seal 515 and a component 516 displaying symmetry of revolution which in this instance has four millings 161 positioned 90° apart. Of course, the invention is not restricted to this configuration and any other combination of number and positions of millings may be considered.

Figure 11:
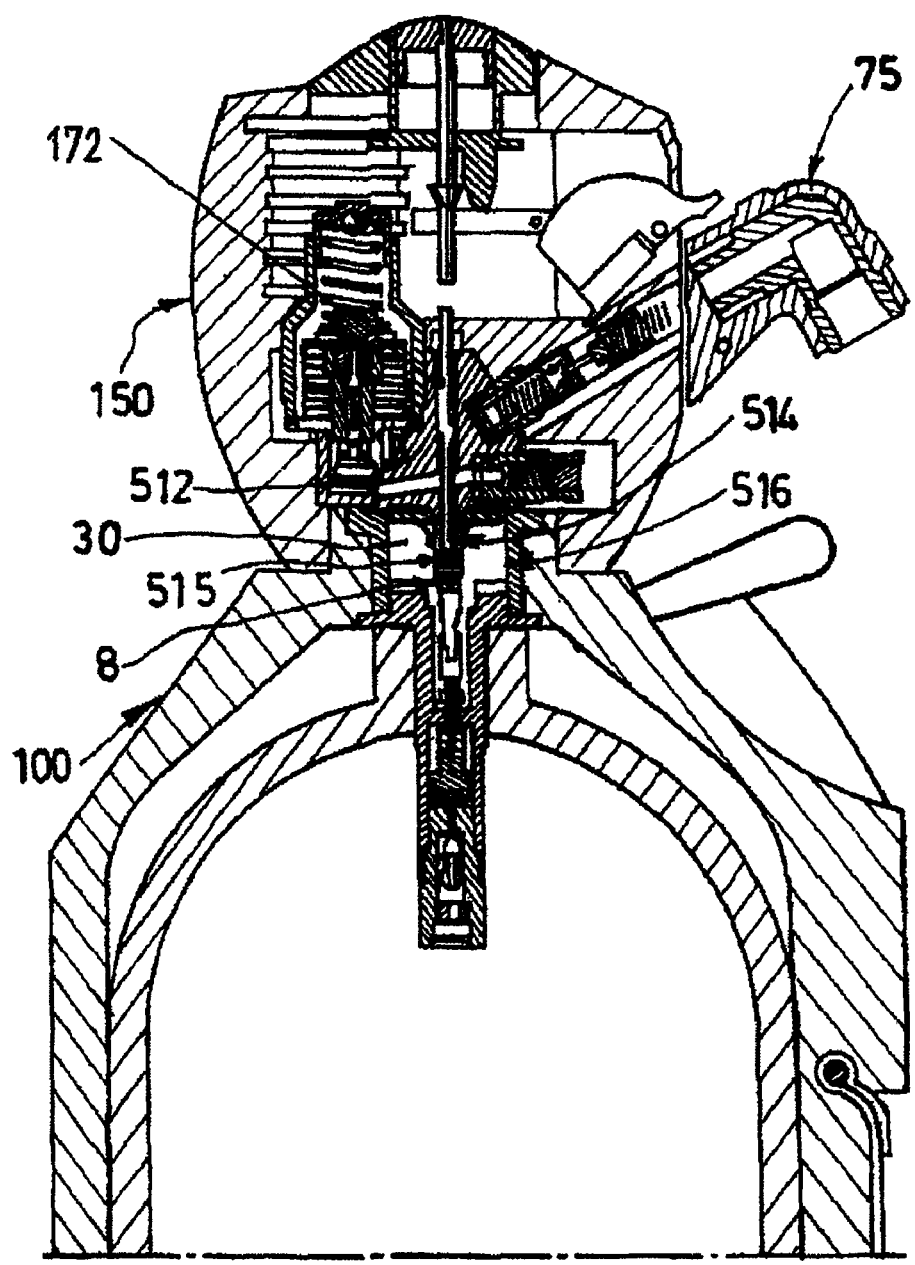
FIG. 11 is a view in longitudinal section of the delivery head of FIG. 10 equipped with its outlet coupling and mounted on a tank according to FIG. 2.

The lower part of the body 512 forms a connection interface that can collaborate with and be attached to the coupling interface of a tank 1 as described hereinabove and illustrated in FIG. 11. In FIG. 11, the gas delivery head 150 mates with and extends the protective jacket 100 of the tank 1.

Passing through the body 512 is a valve driver 17 which is dynamically sealed with respect to said body 512 by an O-ring seal 172.

The upper end of the valve driver 17 comes into contact with the spindle of the control to open up the flow rate of gas 250 when the latter is pressed and locked.

The spindle of the control to open up the flow rate of gas 250 may thus transmit a translational movement to the valve driver 17 which itself passes this translational movement on to the valve stem 8 of the tank 1 described hereinabove. The valve driver 17 therefore projects beyond the lower part of the body 512 to enter the head 2 of the tank 1, so as to open up the flow rate of gas.

The fluid stored in the tank 1 then enters the body 512 by the annular orifice 121. The annular orifice 121 simultaneously, via the transverse drilling 122, supplies a medium-pressure safety valve 123 and a pressure-regulating stage 58.

The medium-pressure safety valve 123 comprises a discharge valve 124 the opening of which is determined by the calibration force of a spring 125. The medium-pressure safety valve 123 is formed in such a way as to allow surplus pressure to be discharged through the louvers 115 formed in the two half-shells 511.

The pressure-regulating stage 58 comprises a mechanism enclosed in a cartridge 88 which is screwed into the body 512 and sealed with respect to the latter by an O-ring seal 881.

Gas enters the pressure-regulating stage 58 by passing through a filter 881 held by an elastic ring 582 held captive in a groove formed in the body 512. The entry of gas into the pressure-regulating stage 58 is also via the passage around a spacer piece 83 that allows the fluid to arrive radially and uniformly at a pressure-regulating valve 84.

As a result of the force of a valve spring 85 and of the action of the gas, the pressure-regulating valve 84 collaborates with a seat 86. The seat 86 is held in place in the cartridge 88 under the action of a threaded seat holder.

The valve 84 is equipped with a stem 841 extending upward and the end of which is in contact with a metal bellows 89. The metal bellows 89 is held in a sealed manner inside the body 12 under the combined action of a screw-on cap 891 and an O-ring seal 893. The valve 84 is subjected to the force of a pressure-regulating spring 891 preloaded by a pressure-regulating screw 892 and the force of the gas on the cross section of the metal bellows 89. Thus, the valve 84 regulates pressure.

Advantageously, the pressure-regulating screw 892 is adjustable so as to allow the user to vary the spring force and therefore the pressure regulation.

Figure 14:
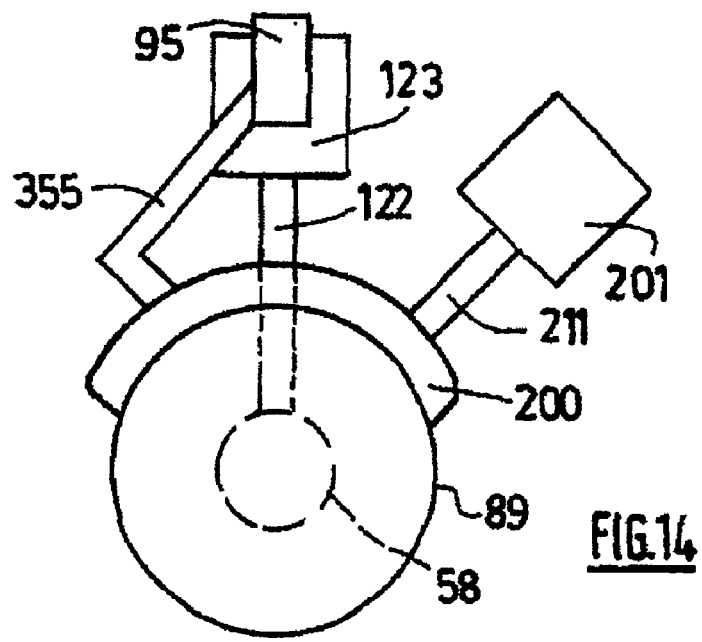
FIG. 14 depicts a schematic and partial view from above of the internal mechanism of the delivery head of FIGS. 7 and 8.
Figure 15:
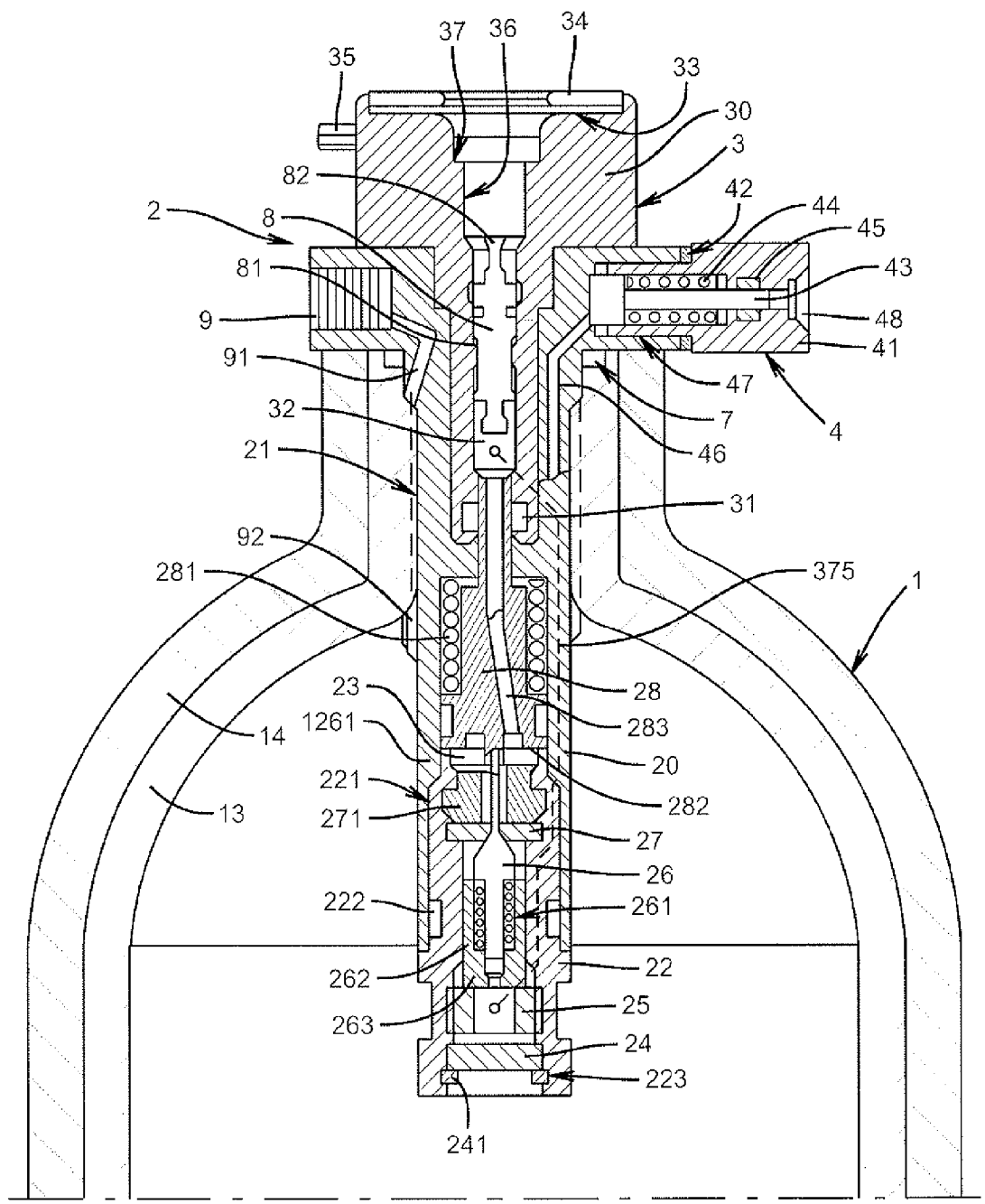
FIG. 15 shows an embodiment that includes a bypass portion (375).

As depicted schematically in FIG. 14, a drilling 200, 355, formed in the body 12 allows the pressure-regulated gas to pass from inside the metal bellows 89 to an outlet connection 95 (FIG. 10).

At the same time, the drilling 200, 211 formed in the body 12 allows the pressure-regulated gas to pass between the metal bellows 89 and a low-pressure discharge valve 201 (of the same type as the valve 123 described hereinabove).

The set points at which the discharge valves 123 and 201 open are chosen to suit the requirements of the application. The medium-pressure valve 123 is, for example, rated to discharge pressures in excess of 20 bar to the outside while the low-pressure discharge valve 201 is rated to discharge pressures in excess of 400 mbar to the outside.

The outlet connection 95 is screwed in a sealed fashion into the body 12. This male outlet connection comprises a skirt 591 containing a shut-off device 592 which is closed by default and sealed against the said skirt 591 by the action of a spring 93.

The shut-off device 592 prevents, on the one hand, the ingress of particles and dirt into the gas circuit when the outlet coupling 75 is not connected. In addition, the shut-off device 592 prevents any flow of fluid to the atmosphere in the event either of forced action on the opening control 250 while the outlet coupling 75 is not connected, or if the outlet coupling 75 becomes disconnected.

The outlet coupling 75 is made up of a body 71 containing a shut-off member 72. The shut-off member 72 is subjected to the action of a spring 73 so that by default it is closed and sealed against said body 71.

This shut-off member 72 on the one hand prevents the ingress of particles and dirt into the gas circuit when the outlet coupling 75 is not connected and on the other hand prevents the fluid contained in the supply pipe of the application from being dumped to the atmosphere if said outlet coupling 75 becomes disconnected. When the outlet valve 75 is connected to the male outlet connection 95, on the one hand, the circuit becomes sealed under the action of an O-ring seal and, on the other hand, the circuit is opened by virtue of the mutual actions of the two shut-off members 72 and 592.

The tank 1 comprises a pre-regulating device incorporated into its neck and, possibly, also incorporated into this same neck, an isolating member. Thus, the very high pressure (the storage pressure) is isolated and the user is protected. The projecting part of the tank contains no high pressure and need not be protected by a bonnet.

The unique inlet/outlet connection interface of this tank is of the quick-coupling type and requires no tooling. Advantageously, this tank 1 can be refilled only with a special-purpose filling connection that collaborates with the unique connection interface of the tank. Access to this interface is found along the main axis of the tank 1, making it possible to conceive of automated filling solutions.

The idea of the automatic dispensing of these canisters, cylinders or tanks may be conceived of for applications both professional and for the general public. Delivery of gas entails either inserting the cylinder, canister or tank into a receiving housing equipped with means of opening the valve and of regulating the gas to suit the application, or connecting a special-purpose head provided with these very means.

Making the connections on the axis of the tank simplifies the handling operations and implicitly improves safety. The interfacing between cylinders, canisters or tanks and the accommodating system or special head is performed in such a way that the connection can be made only if the gas being delivered is actually that expected by the application.

Figure 12:
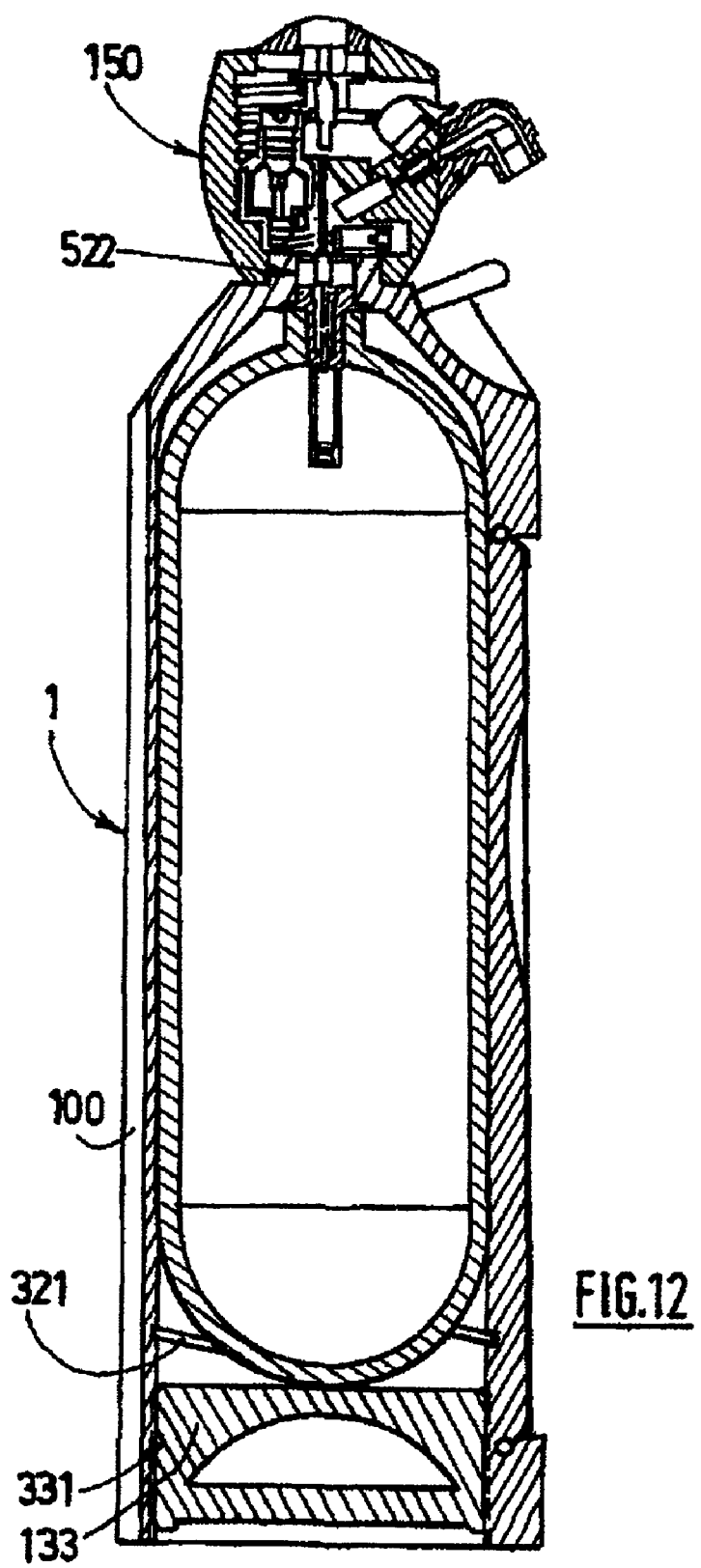
FIG. 12 is a view in longitudinal section of the gas delivery head mounted on the tank.
Figure 13:
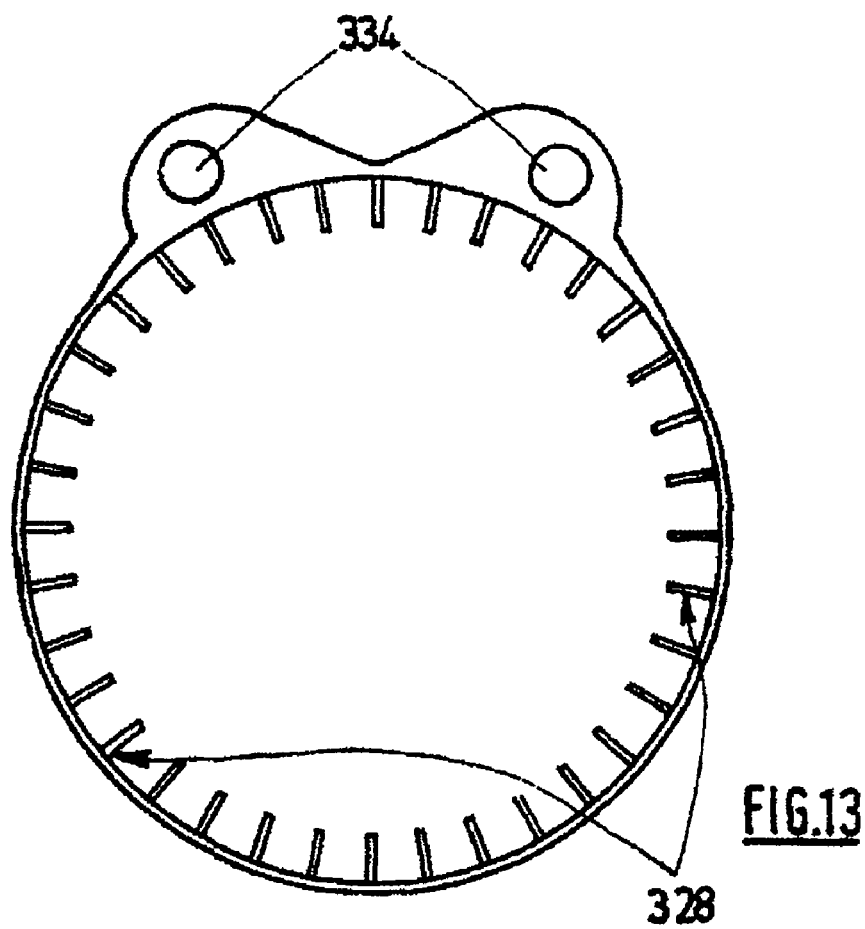
FIG. 13 shows a section of the casing used to protect the tank.

FIG. 12 depicts the gas delivery head 150 mounted on its gas source (tank 1) as described hereinabove. The tank 1 is guided and enclosed in another type of protective jacket 100 with an attached bottom 133. The protective jacket 100 is hollow and on its interior surface has at least one region comprising longitudinal flexible strips 328 (cf. FIG. 13).

The strips 328 secured to the internal wall of the jacket 100 both immobilize the tank in said jacket 100 and compensate for geometric variations thereof resulting in particular from its internal pressure and its manufacturing tolerances. Furthermore, the strips 328 are able to absorb the energy generated if the tank thus clad is dropped or knocked.

The attached bottom 133 of the casing 100 has a helical screw thread 331 intended to be screwed into a helical cut 321 in the body of the jacket 100. The removable bottom 133 thus makes it easier to mount and secure the tank 1 in said protective jacket 100. In addition, the removable bottom 133 means that customary maintenance operations performed on the tank 1 will not be impeded.

The upper part of the jacket 100 may comprise a female recess 522 to position and rotationally index the tank 1 with respect to said jacket 100. In this way, it is possible for example to make the tell-tale that indicates the capacity and the safety members (the discharge valve, the safety feature that melts under the action of heat, the rupture disk, etc.) of said tank 1 tally with corresponding openings in its protective jacket 100.

The invention can be applied to any uses of fluid that demand a great flexibility of use, a good compromise between lightness of weight, size and capacity (autonomy). For example, the gaseous hydrogen for a portable or mobile fuel cell, medical gases, and gases for analysis and laboratory use.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A tank for pressurized fluid, comprising:
   (i) a casing delimiting a storage volume and provided with an orifice for communicating with the inside of the tank, and
   (ii) the tank comprising a filling and distribution head positioned at the orifice, the filling and distribution head comprising:
      (a) a mounting portion intended to be housed in the orifice of the tank,
      (b) an isolating member,
      (c) a pressure-regulating portion housing a pre-regulating device, the pre-regulating device being positioned relative to the mounting portion such that it is housed at least partially inside the tank when the head is in the mounted position,
      wherein the pre-regulating device comprises a pre-regulating valve urged toward a seat and subjected to the opposing force of a pre-regulating piston, and wherein the pre-regulating piston comprises an internal duct connected, on the one hand, to the isolating member and, on the other hand, to a low-pressure chamber situated at the junction between the seat and the pre-regulating piston,
      (d) a filling circuit extending between a first end provided with a filling orifice and a second end intended to communicate with the inside of the tank,
      (e) a tapping-off circuit extending between a first end communicating with the inside of the tank and a second end provided with a tapping-off orifice
      wherein the filling orifice coincides with the tapping-off orifice.

2. The tank of claim 1, wherein the isolating member is an isolating valve.

3. The tank of claim 1, wherein the isolating member is positioned relative to the mounting portion so that the isolating member is at least partially housed inside the volume of the tank when the head is mounted in position in the orifice of a tank.

4. The tank of claim 1, wherein the isolating member is formed in such a way that the isolating member can be opened and/or closed by an actuating element external to the head.

5. The tank of claim 3, wherein the isolating member is formed in such a way that the isolating member can be opened and/or closed by an actuating element external to the head.

6. The tank of claim 1, wherein the isolating member is housed at least partially inside the volume of the head and is accessible to an actuating element external to the head via an access orifice formed in the head.

7. The tank of claim 3, wherein the isolating member is housed at least partially inside the volume of the head and is accessible to an actuating element external to the head via an access orifice formed in the head.

8. The tank of claim 4, wherein the isolating member is housed at least partially inside the volume of the head and is accessible to an actuating element external to the head via an access orifice formed in the head.

9. The tank of claim 5, wherein the isolating member is housed at least partially inside the volume of the head and is accessible to an actuating element external to the head via an access orifice formed in the head.

10. The tank of claim 6, wherein the access orifice providing access to the isolating member coincides with the orifice adapted for filling and for tapping-off.

11. The tank of claim 1, wherein the isolating member is positioned downstream of the pre-regulating device on the tapping-off circuit between the first end and the second end of the tapping-off circuit.

12. The tank of claim 1, wherein the filling and tapping-off circuits have at least one portion in common.

13. The tank of claim 1, wherein the pre-regulating device comprises a two-way valve mechanism selectively allowing pressure-regulated gas to leave the tank or high-pressure gas to enter the tank depending on the pressure differential across the two-way valve mechanism.

14. A tank for pressurized fluid, comprising
   (a) a casing delimiting a storage volume and provided with an orifice for communicating with the inside of the tank, and
   (b) the tank comprising a filling and distribution head positioned at the orifice, wherein the tank is a tank according to claim 1, and in that the isolating member and the pre-regulating device are positioned in one and the same duct along which fluid flows between the inside and the outside of the tank, the filling and the emptying of the tank being performed via one and the same orifice and along one and the same axis that coincides with the axis of the tank.

15. The tank of claim 14, wherein the filling and tapping-off circuits have at least one portion in common.

16. The tank of claim 14, wherein the pre-regulating device comprises a two-way valve mechanism selectively allowing pressure-regulated gas to leave the tank or high-pressure gas to enter the tank depending on the pressure differential across the two-way valve mechanism.

17. The tank of claim 14, wherein the filling circuit comprises a bypass portion that bypasses the pre-regulating device to prevent filling gas from passing through the pre-regulating device during filling.

18. A tank for pressurized fluid, comprising:
(i) a casing delimiting a storage volume and provided with an orifice for communicating with the inside of the tank, and
(ii) the tank comprising a filling and distribution head positioned at the orifice, the filling and distribution head comprising:
   (a) a mounting portion intended to be housed in the orifice of the tank,
   (b) an isolating member,
   (c) a pressure-regulating portion housing a pre-regulating device, the pre-regulating device being positioned relative to the mounting portion such that it is housed at least partially inside the tank when the head is in the mounted position,
   (d) a filling circuit extending between a first end provided with a filling orifice and a second end communicating with the inside of the tank,
   (e) a tapping-off circuit extending between a first end intended to communicate with the inside of the tank and a second end provided with a tapping-off orifice
wherein the filling orifice coincides with the tapping-off orifice;
wherein the isolating member and the pre-regulating device are positioned in one and the same duct along which fluid flows between the inside and the outside of the tank, the filling and the emptying of the tank being performed via one and the same orifice and along one and the same axis that coincides with the axis of the tank; and
wherein the filling circuit further comprises a bypass portion that bypasses the pre-regulating device to prevent filling gas from passing through the pre-regulating device during filling.

* * * * *